(12) United States Patent
Miljkovic et al.

(10) Patent No.: US 9,423,269 B2
(45) Date of Patent: Aug. 23, 2016

(54) SYSTEM AND METHOD FOR REVIEWING TRAVEL TRIPS

(71) Applicant: Automatic Labs, Inc., San Francisco, CA (US)

(72) Inventors: Ljubinko Miljkovic, Oakland, CA (US); Ramprabhu Jayaraman, San Francisco, CA (US); Gabriel Valdivia, San Francisco, CA (US)

(73) Assignee: Automatic Labs, Inc., San Francisco, CA (US)

(*) Notice: Subject to any disclaimer, the term of this patent is extended or adjusted under 35 U.S.C. 154(b) by 147 days.

(21) Appl. No.: 14/049,416

(22) Filed: Oct. 9, 2013

(65) Prior Publication Data

US 2014/0100767 A1 Apr. 10, 2014

Related U.S. Application Data

(60) Provisional application No. 61/711,917, filed on Oct. 10, 2012.

(51) Int. Cl.
*G01C 21/36* (2006.01)
*G07C 5/00* (2006.01)
*G07C 5/08* (2006.01)

(52) U.S. Cl.
CPC ........... *G01C 21/3697* (2013.01); *G07C 5/008* (2013.01); *G07C 5/0858* (2013.01)

(58) Field of Classification Search
CPC ..... G06F 17/40; G07C 5/0858; G01S 7/046; G01S 13/931; G01S 2013/9321
USPC .......... 701/33.3, 409, 123, 33; 340/903, 340/995.13; 345/634, 661
See application file for complete search history.

(56) References Cited

U.S. PATENT DOCUMENTS

| | | | |
|---|---|---|---|
| 2008/0189033 A1* | 8/2008 | Geelen et al. | 701/209 |
| 2010/0087984 A1* | 4/2010 | Joseph | 701/33 |
| 2011/0112717 A1* | 5/2011 | Resner | 701/33 |
| 2011/0307188 A1* | 12/2011 | Peng et al. | 702/33 |
| 2012/0290150 A1* | 11/2012 | Doughty et al. | 701/2 |
| 2013/0184984 A1* | 7/2013 | Armitage et al. | 701/409 |
| 2014/0129080 A1* | 5/2014 | Leibowitz et al. | 701/33.3 |

* cited by examiner

*Primary Examiner* — Jelani Smith
(74) *Attorney, Agent, or Firm* — Donald R. Boys; Central Coast Patent Agency, Inc.

(57) ABSTRACT

A mobile communication device includes a global positioning system (GPS) capability, a digital processor, digital memory, a display screen, and a software (SW) application executing by the processor, the SW providing determining and recording a start of a trip, tracking location of the vehicle after trip start, interpreting data and recording an acceleration event, a deceleration event or a speeding event, recording fuel volume during the trip, determining and recording an end of the trip; and an interactive display including an address at the start and the end of the trip, separated by a timeline for the trip, a vehicle icon moveable along the timeline, icons specific to event type at locations along the timeline representing the acceleration, deceleration and speeding events determined during the trip, and a summary box providing a distance and duration of the trip and fuel efficiency and fuel cost for the trip.

13 Claims, 3 Drawing Sheets

SYSTEM AND METHOD FOR REVIEWING TRAVEL TRIPS

CROSS-REFERENCE TO RELATED APPLICATIONS

The present application claims priority to the filing date of Provisional Patent Application (PPA) with Ser. No. 61/711,917, filed Oct. 10, 2012. All disclosure of the referenced PPA is incorporated in the present application at least by reference.

BACKGROUND OF THE INVENTION

1. Field of the Invention

The present invention is in the field of computer-implemented inventions, and pertains more specifically to managing data for a traveler, and displaying to the traveler details about trips taken in a vehicle.

2. Description of Related Art

Many systems are available in the art that collect information, allow users to enter information, and then use the information collected and entered to display to a user certain aspects of activity to which the entered and collected information pertains. For example, there are programs for general purpose computers that enable a user to take his or her blood pressure, blood oxygen content and the like, and then may display to the user graphs or charts so the user may readily see how her blood pressure has trended over a period of days or weeks.

One area of interest to the present inventors is information related to trips a user may take in a vehicle. Typically vehicles like personal automobiles are not equipped to monitor and record things like location with GPS, speed, acceleration and deceleration, addition of fuel, usage of fuel and the like.

What is needed is a coded program that may execute on a mobile device, such as a smart phone, for example, equipped with GPS and an accelerometer, and an ability for a user to enter information, that may then display to the user for individual trips rich information about each trip, such as duration, incidences of rapid acceleration and deceleration, and the time and location of same, and similar information about trips. Such a system will provide to a user a means of managing expenses in driving, motivation to change driving behavior, and much more.

BRIEF SUMMARY OF THE INVENTION

In an embodiment of the invention a mobile communication device is provided, comprising global positioning system (GPS) capability, a digital processor, a non-transitory digital memory coupled to the processor, a display screen, and a software (SW) application executing by the processor, the SW providing determining and recording a start of a trip in which the mobile communication device is carried in a vehicle, the recording including a geographic location determined by GPS coordinates associated with geographic data, tracking location of the vehicle after trip start by the GPS system, and recording the tracking data, interpreting the tracking data and recording an acceleration event, a deceleration event or a speeding event when vehicle velocity, as determined by position over time by the GPS, exceeds a preprogrammed acceleration, deceleration or speed, the recorded event including magnitude and duration of the event, recording fuel volume at start, addition of fuel during the trip, and usage of fuel during the trip, determining and recording an end of the trip, the recording including a geographic location determined by GPS coordinates associated with geographic data, and an interactive display on the display screen of the mobile communication device, the interactive display including a display in text of an address at the start location and the end location of the trip, separated by a timeline for the trip, a vehicle icon moveable along the timeline, icons specific to event type at locations along the timeline representing the acceleration, deceleration and speeding events determined during the trip, and a summary box providing a distance and duration of the trip and fuel efficiency and fuel cost for the trip.

In one embodiment the mobile communication device is coupled wirelessly by near-field pairing to a Link device connected to an Onboard Diagnostics (OBD) connector of the vehicle, enabling the device to access data from the OBD system for use in the trip recording and event determinations. Also in one embodiment the mobile communication device is coupled wirelessly by a cellular network and an Internet gateway to an Internet-connected server hosted by an enterprise, the Internet-connected server providing data useful by the mobile communication device in the trip recording and event determinations.

In one embodiment the SW application is originally provided to the device by the Internet-connected server. Also in one embodiment start and end of the trip is entered by a user of the device and vehicle through input mechanisms of the mobile communication device. Still in one embodiment fueling events during the trip, including amount and cost of fuel are entered by a user of the device and vehicle through input mechanisms of the mobile communication device.

In some embodiments the SW application is executed remotely on the Internet-connected server, and data is transmitted between the Internet-connected server and the mobile communication device via an Internet connection. Also in some embodiments multiple trips are recorded, and the interactive display on the display screen of the mobile communication device shows more than one trip along the timeline, and is scrollable to show more recorded trips taken by a user of the vehicle.

In some embodiment the vehicle icon is moveable by touch or by click and drag, and positioning the vehicle icon at an event icon, additional detail about the event is displayed, and in some embodiments the display includes an input to cause a display of the trip on a map which may be zoomed in or out to display additional or less geographic detail.

In some embodiments events determined for the trip are displayed along the path of the vehicle on the map where the events occurred. Also in some embodiments tapping or clicking as appropriate for display screen type on text boxes and icons causes additional information about events or data to be displayed. In other embodiments data for a trip is enabled to be downloaded from the mobile communication device to a portable memory device or to a computerized appliance in a form that may be coherently displayed, transmitted to other devices, and printed.

DETAILED DESCRIPTION OF THE INVENTION

Figure 1:
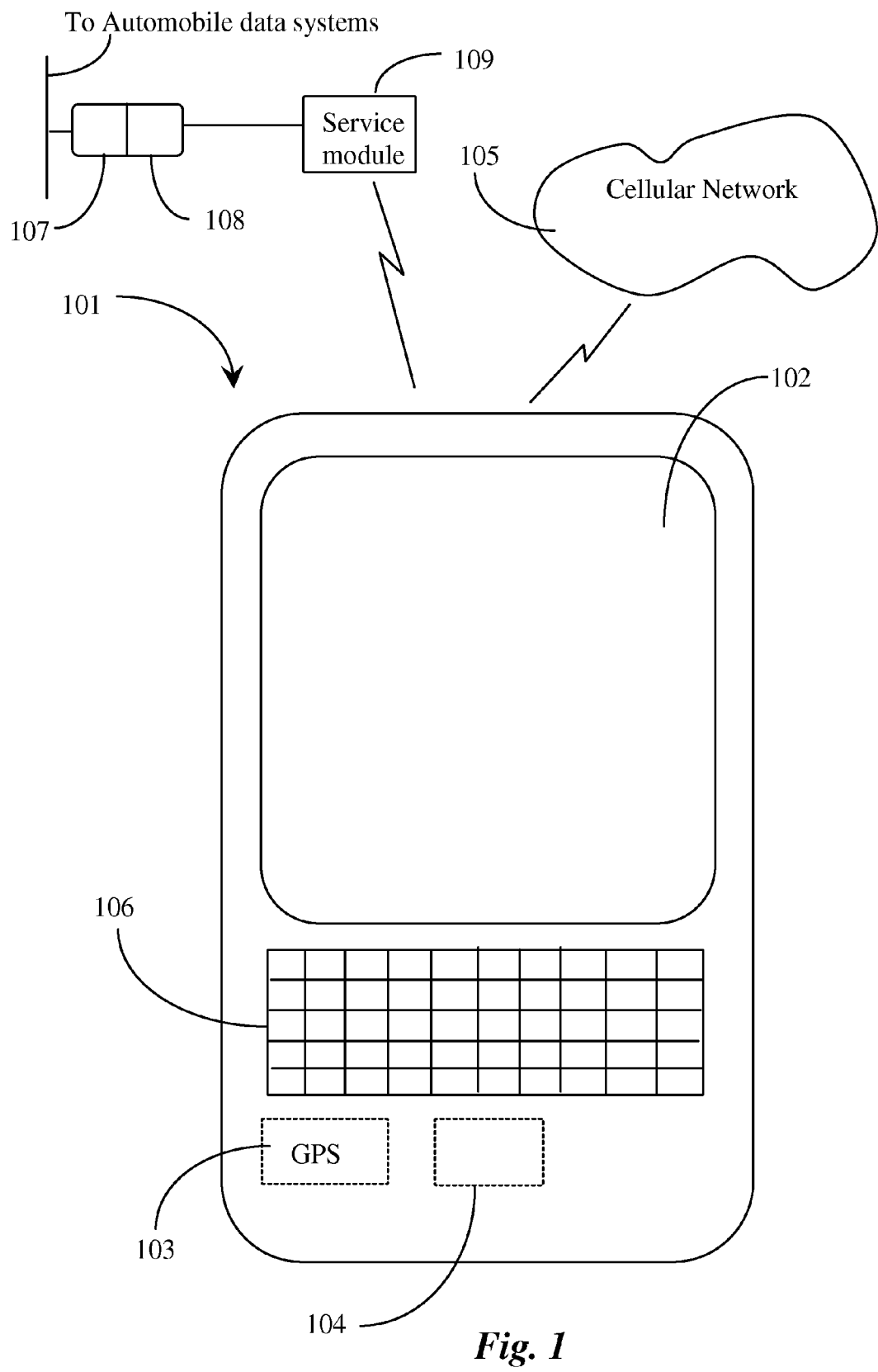
FIG. 1 is a diagram illustrating devices in an embodiment of the invention.

FIG. 1 is an architectural diagram of a user's device 101 in an embodiment of the invention. Device 101 may be a mobile device, preferably having a touch-screen display 102, a Global Positioning System(GPS) subsystem 103, an internal memory 104, Internet access ability via a cellular Network 105 and mechanisms 106, such as a keyboard and pointer, for a user to enter data. Instead of a keyboard and pointer, a touchscreen of the device may provide a touch version of a keyboard and pointer positioning by touch. In another embodiment a keyboard and pointer may be added by, for example, a USB port. All of these capabilities may not be necessary in some embodiments of the invention. Such devices in embodiments of the invention may be personal cellular telephones, currently termed smart-phones in the art, Pad devices like the well-known iPAD™, personal digital assistants, portable computers of several different types, including lap-top computers, and proprietary devices that have the capabilities needed in different embodiments of the invention.

Also illustrated in FIG. 1 is a service module 109 enabled to connect to On-Board Diagnostics (OBD) systems in various vehicles. The inventors term this module a Link device, which is in itself unique, and which is taught and claimed in another application.

Link 109 in various embodiments of the present invention is connected to the OBD Port of a vehicle, as is shown in FIG. 1, and acts like a wireless gateway to the vehicle's OBD system through the vehicle's OBD port. Link 109 presents itself as an Application Programming Interface (API), which is accessible wirelessly. Capabilities of the Link are available for use by any application written to leverage these APIs.

Link 109 is capable of reading various diagnostics information, such as amount of fuel left in a gas tank or charge left on a battery of a battery-powered vehicle. OBD systems provide a great deal of such information. Link 109 also has Bluetooth pairing capability, or other near-field wireless communication capability, and is thus enabled to pair with device 101 to provide OBD data in real time.

Figure 3:
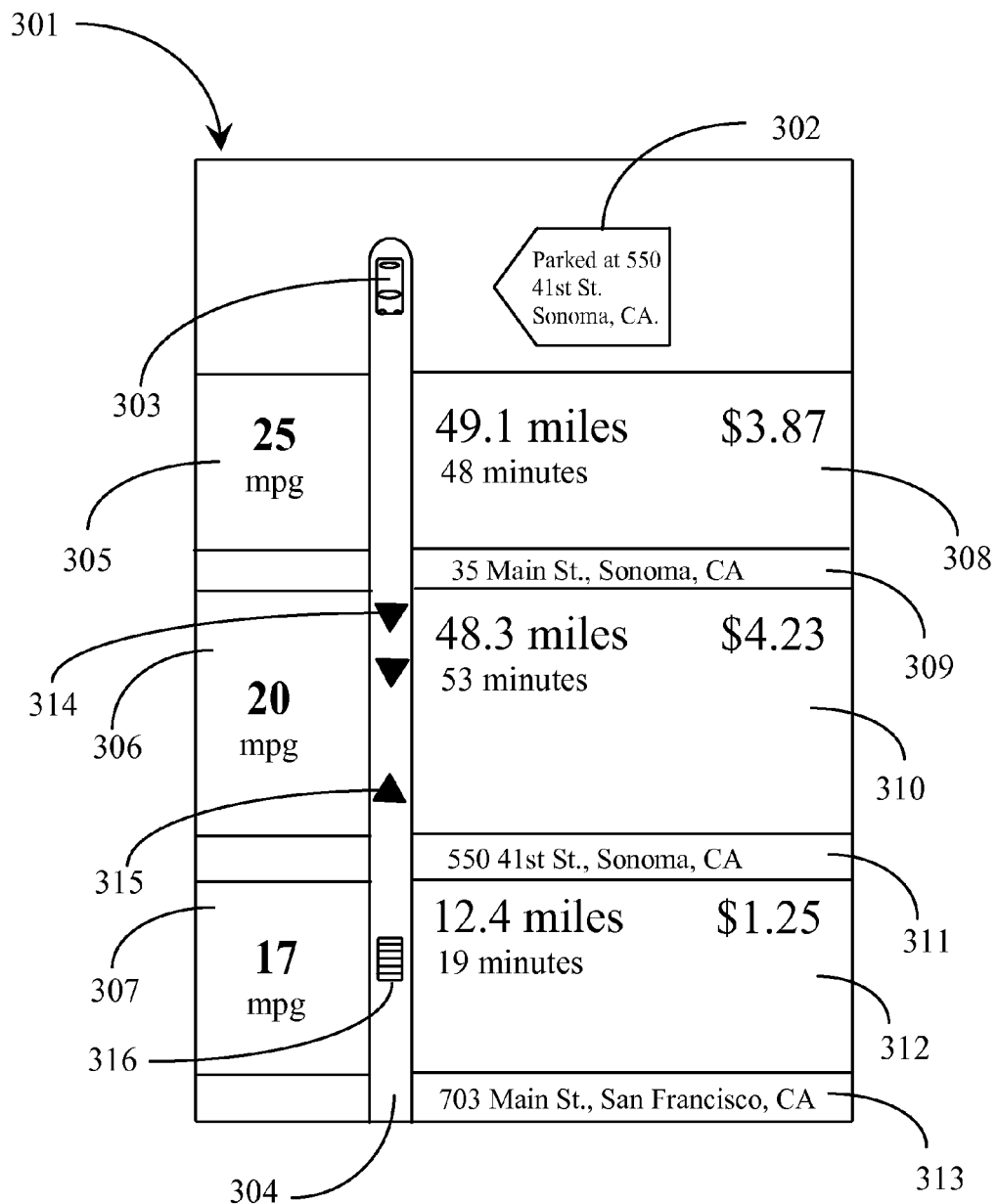
FIG. 3 is an illustration of a display presented on a user's device in an embodiment of the present invention.

FIG. 3 is an architectural diagram illustrating an Internet-connected server 205 in the Internet Network 206, which may be hosted by an enterprise that markets versions of software (SW) in embodiments of the present invention. Server 205 is coupled to a memory 207 wherein versions of SW developed in embodiments of the invention may be stored. One version 208 is illustrated as stored in memory 207.

Device 101 described in detail above, has access through cellular network 105 having base station 201 and an Internet gateway 202 via path 203 to Internet backbone 204, representing all connections and interconnections in the Internet network. Server 205 is connected to backbone 204. Thus a user of device 101, having an Internet browser application may access one or more web page at server 205, enabling the user to download to device 101 a version 208 of SW according to an embodiment of the invention. Versions of SW 208 may be provided having a different range of functionality, and may be specifically enabled to execute on specific types of devices 101 using different operating systems.

In alternative embodiments SW 208 may be provided in other ways to a user. A user, for example may purchase a version of SW 208 that may be delivered on a disk or a thumb drive, and use a general purpose computer to transfer the SW to device 101. There are many possibilities.

In many embodiments device 101 maintains contact with server 205 and all execution of SW 208 is at server 205.

SW 208 in various embodiments when executed on device 101 or by server 205 provides a system enabling a user to track activities and occurrences in trips taken in a vehicle, accompanied by device 101. The device itself, when SW 208 is executing as initiated by a user, tracks the vehicles location (same as device 101 location), and records velocity data, acceleration and deceleration, and time of day and date, as well as other data in some versions of the SW, in a manner that SW 208 may use to calculate and store data in different ways. The SW may, for example, note a very sudden deceleration from a velocity, followed by a stationary location for a threshold time, and interpret that series of events as an accident. The SW may be enabled to place an emergency call under such a circumstance. The SW may note instances of speeding, determined by device velocity and knowledge of speed limit at the GPS location when the speeding is recorded, and issue an alert in some manner to the driver. There are many possibilities.

An important function of the SW is to track activities and characteristics during a trip, where the beginning and end points may be set by a user, or determined automatically by SW 208. The device through SW 208 may, for example, determine a vehicle is parked by noting that it has not moved for more than 30 minutes, for example. The device, when the vehicle (same location as the device) begins to move again, may determine and record that a new trip is being tracked, and keep recording data until determining that the vehicle is parked again. In another embodiment there may be inputs specific for a user to inform the device that a new trip is commencing, and also to inform the device when the trip is finished. The two norms may work together, for example, the device may identify and start the tip, and the user may inform the end of the trip.

During a specific trip the device, through SW 208, records vehicle speed and perhaps direction as well, associated with date and time of day, throughout duration of the trip. The device may have preprogrammed thresholds for determining sudden braking events, excessive speed events, and the like through GPS location data associated with passing time, or may have a built-in accelerometer useful for such determination. In some embodiments the device may access information at server 205 for use in determinations by SW 208. For example, in some embodiments, when a driver stops for fuel, device 101 may access date at server 205 for fuel price. Server 205 in these embodiments maintains an extensive database, updated periodically, of fuel prices indifferent locations, such as within the boundaries of Oakland, Calif. This data cannot, of course, be accurate for every service station, but will be very close. Db 207 may store extensive data of other sorts as well for use by SW 208. One such body of data is a map of different locations that may be data in a trip recorded by device 101 through SW 208. In some embodiments server 205 accesses Google Maps™ for map data to display in cooperation with a device 101 and SW 208. Data input to device 101 and SW 208 is also, in some embodiments, made available through OBD-connected Link 109.

Device also enabled the user to input data such as fuel price and volume pumped at specific points in a trip when the driver stops for fuel. In some embodiments there may be facility for a user to input specific notes to be used in a preprogrammed manner by SW 208. So in various embodiments data required for calculation and preparation of outputs of device 101 is available from a variety of sources.

FIG. 3 is an illustration of an interactive display 301 provided in one embodiment to a user on a screen of device 101. An important element of display 301 is a vehicle icon 303, which is guided in a path 304 in the display. As a user records a trip a trip icon 303 may be seen to move along path 304. Further, icon 303 may by color and other detail be made to represent a particular vehicle involved in a trip analysis. In some embodiments, wherein a user may have more than one vehicle he or she wants to use with the system of the invention, an identity of the automobile may be entered in display 301. In embodiments wherein Link 109 is used, the Link may identify the vehicle as a result of access to the OBD system of the automobile, and may pass that identity by near-field wireless pairing to device 101.

In display 301 the recording of a trip is locked into date and time for all activities and events, and the time line is vertical in the display from the bottom up. The display also is always just a partial display of recorded trips, and is scrollable either upward to see more recent trips, or downward to see trips further in the past. The display on an interactive touch screen in many embodiments may be scrolled by gentle stroke with a user's finger, as is well known in many devices having touch screens. In some embodiments other means of scrolling may be provided, such as a conventional scroll bar.

Returning now to display 301, vehicle icon 303 is shown at the top of the vehicle path 304, and label 302 provides the location of the vehicle as parked at 550 1st St. in Sonoma, Calif. In some embodiments a user may tap on label 302, and the system will respond by displaying a map of Sonoma showing the location of the parked vehicle in Sonoma.

There are summary reports of three trips shown in the display of FIG. 3. A first trip shown is from 703 Main Street, San Francisco, Calif. (313), to 550 41st Street, Sonoma, Calif. The summary report 312 for this trip indicates the distance traveled was 12.4 miles, the duration was 19 minutes, and the cost in fuel was $1.25. On the left, at 307, the fuel efficiency for the trip is indicated as 17 mpg.

A second trip is shown as proceeding from 550 41st Street, Sonoma, Calif. (311) to 35 Main Street, Sonoma, Calif. (309). For this trip, as shown in summary report 310, the distance traveled was 48.3 miles, the duration was 53 minutes, and the fuel cost was $4.23. Fuel efficiency at 306 is shown to be 20 mpg. Perhaps the user drove around Sonoma for a considerable time instead of driving directly to the second address from the first.

A third trip is shown as commencing at 35 Main St., Sonoma, Calif. (309) and proceeding to 550 41st St., Sonoma, Calif. (302). Summary report 308 indicates this trip was 49.1 miles, duration was 48 minutes, fuel cost was $3.87, and fuel efficiency was 25 mpg. Again, Sonoma must be a big place.

Some notable events occurring during trips are indicated along path 304 at the time they occurred. Two events 314 are sudden acceleration events, and are indicated by a particular triangular icon pointing upward, and occurred during the second trip. One sudden deceleration event 315, shown as a particular icon pointing downward, is indicated during the second trip displayed. A speeding event 316, also indicated by a particular icon, is shown during the first trip.

As described above, more trips may be reviewed in display 301 by scrolling. Also, in many embodiments, a user may drag vehicle icon 303 to other positions in path 304. Dragging vehicle 303 to a position in the path adjacent to summary 310 may, in some embodiments, cause the system to display additional information about the trip. In one embodiment the additional information will be a map of the trip. Positioning the vehicle at one of the acceleration, deceleration or speeding events will in some embodiments cause the display to indicate further detail about these events, such as, for example, for a deceleration event, the speed decrease over the time that caused the system to record a deceleration event. There are coded instructions at server 205 or in the app running on device 101 that have specific conditions for comparison against events recorded during a trip, and determining an acceleration, deceleration or speeding event. The system also has stored data, updated periodically, for speed limits in all areas that a user's vehicle may travel.

Information provided by the system in display to the user, is not limited to display in the summary panels such as panels 308, 310, and 312. Such additional information may be presented in pop-up windows, for example, that may be connected to the icon of the event.

In some embodiments the record of trips may be downloaded from device 101, or from server 205 in segments, either as individual trips or as groups of adjacent trips, in a manner that the record may be emailed or transmitted to others, and may be displayed on a monitor computerized appliance, such as a pad device of a laptop computer, and may be printed. This record can be limited to a summary report, or can have any level of detail including all of the data stored for the trips.

Many drivers today have little insight into how their driving habits impact their vehicle's fuel efficiency, safety, and cost of gasoline. Further, because filling up at a pump or a charger occurs infrequently relative to the vehicle trips people take, drivers often lack an intuition for the cost of their individual trips or the cost of their driving habits overall. The present invention in several embodiments for reviewing trips allows users to review the trips they've taken in a timeline, following a vertically-animated vehicle as it moves from location to location along the user's driving path. The vertical space between each location represents the trip's length, and contains trip statistics like distance and time travelled, average fuel efficiency (MPG), fuel efficiency over time, and fuel cost ($). The display also presents safety events such as sudden braking maneuvers, fast accelerations, and incidents of speeding, all of which can negatively impact fuel efficiency and driver safety, of which many drivers are currently unaware.

Elements of the overall system in various embodiments of the invention include the Link device 109, which is capable of accessing data from the vehicle's OBD system, and is capable of providing the OBD information to a user's mobile device 101. The user's device 101 is an essential element in embodiments of the invention, and monitors vehicle activity through on-board systems such a GPS, and in some cases an accelerometer. Device 101 also maintains communication with Internet-connected server 205, which provides many services, including the application that executes in device 101 to provide practice of the invention, and data of many sorts useful in embodiments of the invention.

In some embodiments connection to server 205 is not necessary, and Link device 109 is not used. In these embodiments all data and function is provided by device 101 executing SW 208. In some other embodiments device 101 and Link device 109 are used, but not with connection to server 205. In these embodiments device 101 has access to information from the vehicle's OBD system. In other embodiments Link device 109, device 101 and server 205 are all involved, and this embodiment provides maximum functionality.

Figure 2:
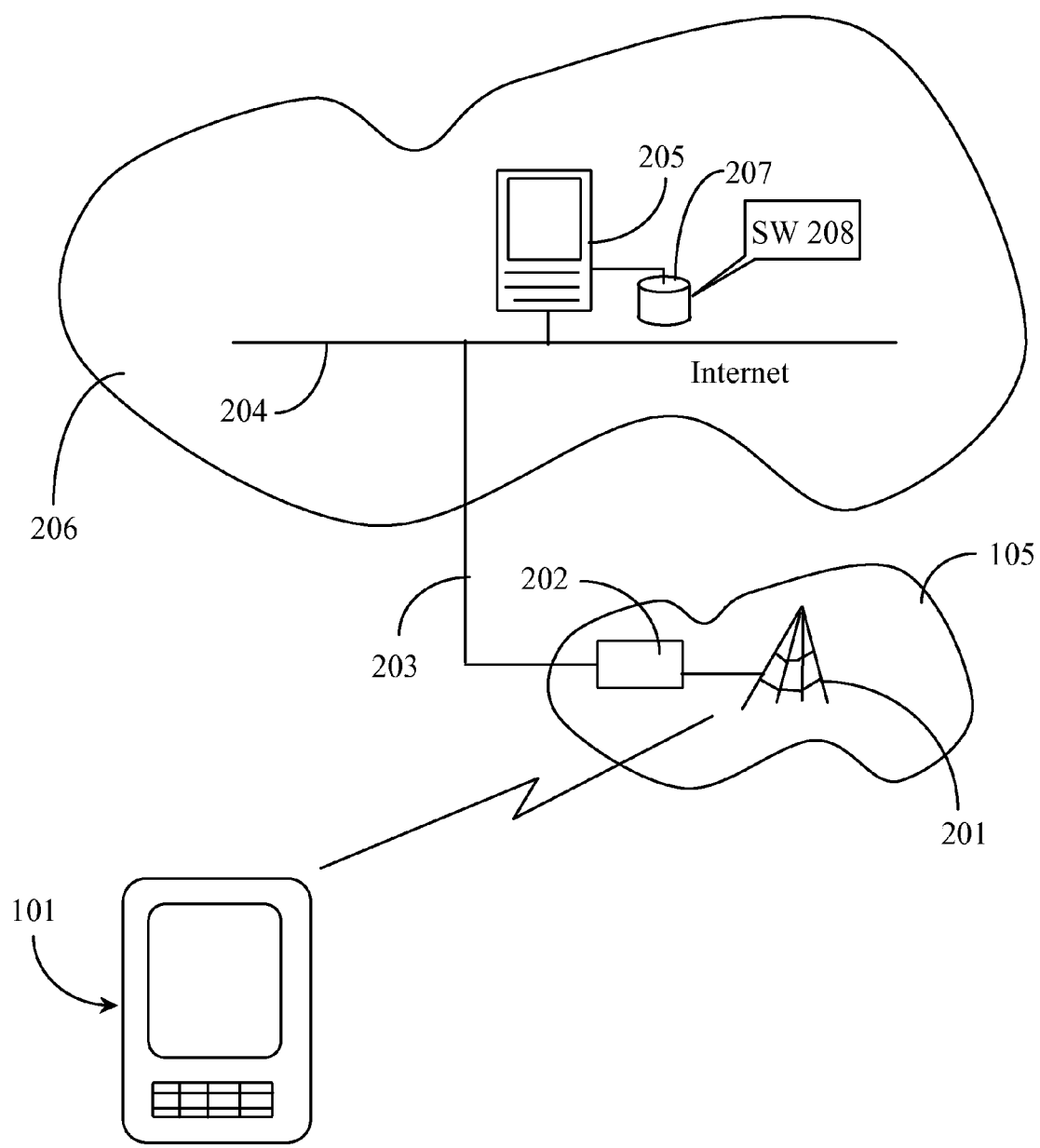
FIG. 2 is an architectural diagram illustrating an Internet-connected server, a cellular network, and a user's mobile device in an embodiment of the invention.

It will be apparent to the skilled person that there are many versions and embodiments of the present invention that may not be explicitly described in this specification. The specification provides examples of elements and practice of the invention in several ways to teach the apparatus and practice of the invention in enabling fashion. The invention, however, may be practiced in many instances by altering one or more details. For example, there are many ways that text may be displayed in the interactive display of FIG. 2, and selecting a different display technique that is not explicitly described herein does not constitute a new invention. Al such alterations are within the scope of the present invention, which scope is limited by the claims that follow.

The invention claimed is:

1. A mobile communication device, comprising:
global positioning system (GPS) capability;
a digital processor;
a non-transitory digital memory coupled to the digital processor;
a display screen; and
a software (SW) application executing by the digital processor, the SW application providing:
determining and recording a start of a trip in which the mobile communication device is carried in a vehicle, the recording a start of a trip including a geographic location determined by GPS coordinates associated with geographic data;
tracking location of the vehicle after the trip start by the GPS system, and recording the tracking location;
interpreting the tracking data and recording an acceleration event, a deceleration event, position of the vehicle over time as determined by the GPS, or a speeding event and determining vehicle velocity, wherein a change in the determined vehicle velocity indicates at least one of exceeding a preprogrammed acceleration, deceleration or speed threshold, the recorded event including magnitude and duration of the recorded event;
recording fuel volume at the start of a trip, addition of fuel during the trip, and usage of fuel during the trip;
determining and recording an end of the trip, the recording an end of the trip including a geographic location determined by GPS coordinates associated with geographic data; and
an interactive display on the display screen of the mobile communication device, the interactive display including a display in text of an address at the start of the trip and the end of the trip, separated by a representation of a timeline for the trip,
a vehicle icon moveable along the timeline, event icons specific to an event type at locations along the timeline representing the acceleration event, the deceleration event and the speeding event determined during the trip, and a summary box providing a distance and duration of the trip and fuel efficiency and fuel monetary cost for the trip.

2. The mobile communication device of claim 1 wherein the mobile communication device is coupled wirelessly by near-field pairing to a Link device connected to an Onboard Diagnostics (OBD) system via an OBD connector of the vehicle, enabling the Link device to access data from the OBD system for use in the trip recording and event determinations.

3. The mobile communication device of claim 1 wherein the mobile communication device is coupled wirelessly by a cellular network and an Internet gateway to an Internet-connected server hosted by an enterprise, the Internet-connected server providing data useful by the mobile communication device in the trip recording and event determinations.

4. The mobile communication device of claim 1 wherein the SW application is originally provided to the mobile communication device by the Internet-connected server.

5. The mobile communication device of claim 1 wherein start and end of the trip is entered by a user of the device and vehicle through input mechanisms of the mobile communication device.

6. The mobile communication device of claim 1 wherein fueling events during the trip, including amount and cost of fuel are entered by a user of the device and vehicle through input mechanisms of the mobile communication device.

7. The mobile communication device of claim 3 wherein the SW application is executed remotely on the Internet-connected server, and data is transmitted between the Internet-connected server and the mobile communication device via an Internet connection.

8. The mobile communication device of claim 1 wherein multiple trips are recorded, and the interactive display on the display screen of the mobile communication device shows more than one trip along the timeline, and is scrollable to show more recorded trips taken by a user of the vehicle.

9. The mobile communication device of claim 1 wherein the vehicle icon is moveable by touch or by click and drag, and positioning the vehicle icon at an event icon, additional detail about the event is displayed.

10. The mobile communication device of claim 1 wherein the display includes an input to cause a display of the trip on a map which may be zoomed in or out to display additional or less geographic detail.

11. The mobile communication device of claim 10 wherein events determined for the trip are displayed along the timeline as depicted on the map where the events occurred.

12. The mobile communication device of claim 1 wherein tapping or clicking as appropriate for display screen type on text boxes and icons causes additional information about events or data to be displayed.

13. The mobile communication device of claim 1 wherein data for a trip is enabled to be downloaded from the mobile communication device to a portable memory device or to a computerized appliance in a form that may be coherently displayed, transmitted to other devices, and printed.

* * * * *